Oct. 31, 1961 A. J. KING 3,007,089
SEMI-CONDUCTOR
Filed Dec. 22, 1958
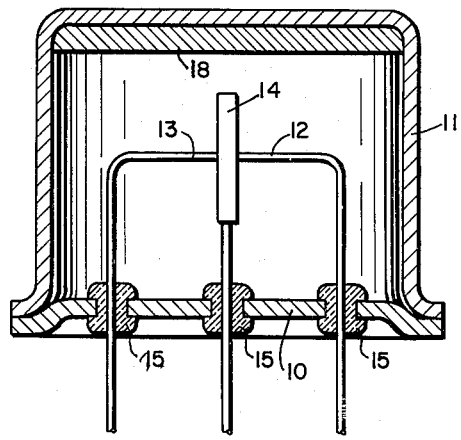
INVENTOR.
Aden J. King
BY
D. Emmett Thompson
ATTORNEY 3,007,089
SEMI-CONDUCTOR
Aden J. King, 2202 E. Colvin St., Syracuse, N.Y.
Filed Dec. 22, 1958, Ser. No. 782,014
2 Claims. (Cl. 317—234)

This invention relates to semi-conductors such as transistors and rectifiers. The presence of moisture and/or oxygen within the hermetically sealed casing of a semi-conductor has been found to be deleterious to the proper functioning of the device.

This invention has as an object a semi-conductor incorporating a desiccant which functions to remove undesired moisture and other gases, including particularly oxygen and nitrogen, or to reduce such gases to a suitable concentration level. To accomplish this object, I employ a metallic desiccant which can be conveniently incorporated in the metallic casing of the semi-conductor previous to the same being hermetically sealed, and which effectively combines directly with any moisture present in the sealed casing to form exceedingly stable compounds which do not dissociate to yield water, or other undesirable products and which reacts with oxygen present in the casing to also form a completely stable end product.

In describing this invention, reference is had to the accompanying drawing which illustrates a semi-conductor embodying my invention, and in which the semi-conductor is disclosed in the form of a transistor having a casing, consisting of a base 10 and a cap member 11 hermetically sealed to the base 10, the electrode elements consisting of a collector 12, an emitter 13 and a crystal 14. These electrodes are provided with leads hermetically sealed in the base 10, as by glass seals 15.

The metallic desiccant is formed from, or consists of, one or more metals from the alkali-metal group, potassium, sodium, lithium, and of the alkaline-earth metal group, barium, strontium and calcium.

I have found that these metals and their intra and inter-group alloys combine directly with moisture to form exceedingly stable compounds which do not dissociate to yield water, or other undesirable products, which is the case of the more commonly used desiccants which combine with water vapor to form compounds in which the water is bound rather loosely. As a consequence, such other desiccants exhibit a definite vapor pressure of water and therefore, are capable of reducing the moisture content of a space to a limited degree only and under no practical conditions will all the water be removed.

On the other hand, desiccants in the form of one of the metals, potassium, sodium, lithium, barium, strontium, calcium, or in the form of an alloy consisting of two of such metals will, as previously stated, form exceedingly stable compounds. For example, lithium reacts with water to form lithium oxide and lithium hydroxide, the hydrogen which is evolved in the reaction does not in any way interfere with the functioning of the transistor. Similarly, lithium reacts with oxygen to form the completely stable lithium oxide.

Analogous reactions will occur for any of the metals listed above, or their alloys. As an example of such an alloy, 10% barium, 90% lithium is strongly reactive toward moisture. The composition of the alloy percentagewise is not critical since a 90% barium–10% lithium alloy would be equally effective. There would, however, be a difference in weights required to accomplish the same end. For example, it requires 78.68 grams of barium to combine with the same amount of water as 6.940 grams of lithium. Weight for weight, lithium is 11.3 times as efficient as barium but the end result is the same and satisfactory if proper amounts of the metals are used in each case.

The selection of a metal from the group mentioned, or the alloying of two of the metals is determined by the practical aspects involved in each case, such as the handling of the metal, the fabrication of the desiccant, the temperature at which the semi-conductor will operate, etc. For example, lithium or sodium, or lithium or or sodium alloyed with barium, strontium or calcium, have the advantage of low melting point and softness, which properties make them more practical than the use of pure barium, strontium, or calcium, from the standpoint of fabrication into a useful form. For example, these active metals, particularly the softer ones such as lithium, or lithium barium alloy (90% lithium) can be extruded in the form of wire of suitable diameter. The wire is cut into lengths of proper size and weight and pressed into the top cap 11 of the transistor casing, in which event the metal or alloy will bond very tightly to the metal cap under pressure. It can be removed only by scraping it off, or by dissolving it away from the base metal with a suitable solvent. Also, the metal, or alloy, may be readily formed in the shape of disks, as indicated at 18, and pressed into the top of the cap 11. The effective bond between the metal or the alloy to the cap has the distinct advantage in that no retaining mechanism is required to hold the reactive metal in place after pressing it into position.

I have found that the product of reaction formed on the surface of the active metal does not hinder further reaction, the absorption being continuous and the rate of absorption essentially linear over the entire period of reaction until the active metal is completely consumed.

The metallic desiccant may also be affixed to an area of the inner surface of the casing by causing the desiccant to melt and bond to the casing. This is accomplished by heating the casing with a desiccant positioned therein in an inert gas, such as argon or helium.

What I claim is:
1. A semi-conductor comprising a hermetically sealed casing containing a plurality of electrode elements, a quantity of metallic desiccants in said casing, said desiccants being a composition consisting of two metals selected from the group potassium, sodium, lithium, barium, strontium and calcium.
2. A semi-conductor comprising a hermetically sealed casing containing a plurality of electrode elements and a quantity of metallic desiccant consisting of a lithium barium alloy bonded to the interior of said casing.

References Cited in the file of this patent

UNITED STATES PATENTS

| | | |
|---|---|---|
| 2,460,109 | Southworth | Jan. 25, 1949 |
| 2,686,279 | Barton | Aug. 10, 1954 |
| 2,928,030 | Lighty | Mar. 8, 1960 |